US008077574B2

(12) United States Patent
Yajima et al.

(10) Patent No.: US 8,077,574 B2
(45) Date of Patent: Dec. 13, 2011

(54) DRIVE DEVICE AND METHOD FOR CONTROLLING THE SAME

(75) Inventors: Masatoshi Yajima, Kadoma (JP); Kenji Kawano, Kadoma (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/913,775

(22) Filed: Oct. 28, 2010

(65) Prior Publication Data

US 2011/0103209 A1    May 5, 2011

(30) Foreign Application Priority Data

Nov. 2, 2009 (JP) ................................. 2009-251690

(51) Int. Cl.
G11B 7/00 (2006.01)
(52) U.S. Cl. ............... 369/53.28; 369/44.28; 369/44.27; 369/44.25; 369/53.23
(58) Field of Classification Search ............... 369/44.28, 369/44.27, 44.25, 53.23, 53.28
See application file for complete search history.

(56) References Cited

U.S. PATENT DOCUMENTS

| 5,850,081 A | * | 12/1998 | Yanagisawa | ............... | 250/201.5 |
| 7,839,733 B2 | * | 11/2010 | Nakai | ......................... | 369/44.32 |
| 2009/0028021 A1 | * | 1/2009 | Yin et al. | .................. | 369/53.17 |

FOREIGN PATENT DOCUMENTS

JP   2001-222827 A   8/2001

* cited by examiner

Primary Examiner — Latanya Bibbins
(74) Attorney, Agent, or Firm — Judge Patent Associates

(57) ABSTRACT

An optical drive includes: an optical pickup; a preprocessing circuit which processes an optical signal detected by the optical pickup; nonvolatile memory having stored therein relation information which represents the relation of a signal balance with respect to a signal difference between a TE signal and an FE signal at the time of a predetermined operation of the optical pickup; and a central processing circuit which performs focus control of the optical pickup. The preprocessing circuit generates the signal balance of the optical pickup. The preprocessing circuit also obtains the FE signal and the TE signal with respect to the optical disc. The central processing circuit derives a phase difference and an amplitude difference from the signal balance and the relation information, and calculates, based on the differences and the TE signal, a FE signal suitable for the predetermined operation.

9 Claims, 8 Drawing Sheets

DRIVE DEVICE AND METHOD FOR CONTROLLING THE SAME

CROSS REFERENCE TO RELATED APPLICATION

The disclosure of Japanese Patent Application No. 2009-251690, filed Nov. 2, 2009, is incorporated herein by reference.

BACKGROUND OF THE INVENTION

1. Field of the Invention

The present invention relates to drive devices for optically recording information onto or reproducing recorded information from an information layer of an optical information recording medium (hereinafter referred to as an optical disc).

2. Description of the Background Art

As conventional drive devices, devices for recording information onto or reproducing information from optical discs such as Compact Discs (CDs), Digital Versatile Discs (DVDs), and Blu-ray Discs (Registered Trademark; BDs) have been developed and manufactured.

Japanese Laid-Open Patent Publication No. 2001-222827 (Patent Literature 1), for example, discloses the above drive devices. Such drive devices disclosed in Patent Literature 1 are provided with an optical pickup which employs an astigmatism method. Such drive devices operate as follows in order to suppress crosstalk caused by crossing tracks on an optical disc. The drive device stores in memory the relations of the phase and the amplitude between a push-pull signal of a main spot and a cycle component of focus crosstalk crossing toward the outer diameter side. Using a push-pull signal of a half track pitch distanced sub spot or main spot, the drive device invokes data representing the stored relations of the phase and the amplitude, and thereby produces a focus crosstalk signal. Then, through a calculation using the focus crosstalk signal and a focus signal of the main spot, the drive device offsets the track crossing crosstalk.

However, the drive devices disclosed in Patent Literature 1 require, at the time of start-up, a large amount of time to generate a signal (data representing the relations of the phase and the amplitude) for correcting the crosstalk.

More specifically, the drive devices disclosed in Patent Literature 1 rotate an optical disc at the time of start-up so as to detect a focus error signal, and thereby perform focus control and tracking control. Since the drive devices need to read and learn a push-pull signal and a focus crosstalk signal, the drive devices require a large amount of time to generate a signal (relation data) for correcting crosstalk.

SUMMARY OF THE INVENTION

An object of the present invention is to provide a drive device which is capable of performing a stable focus control so as to solve the aforementioned problem.

That is, a drive device of the present invention includes: an optical pickup which includes a light source, an objective lens which converges light from the light source onto an optical disc, a drive section which drives the objective lens so as to control focus onto the optical disc, and a photodetector section which detects light reflected from the optical disc; a generation section which generates, based on an optical signal detected by the photodetector section, balance information which represents deviation in a photodetector pattern on the photodetector section in the tangential direction of the optical disc; an FE obtaining section which obtains, based on the optical signal detected by the photodetector section, an FE signal which represents an amount of focus deviation of the objective lens relative to the optical disc; a TE obtaining section which obtains, based on the optical signal detected by the photodetector section, a TE signal which represents an amount of tracking deviation of the objective lens relative to the optical disc; a storage section which previously stores therein relation information which represents relation of a signal difference between the FE signal and the TE signal, at the time of a predetermined operation of the optical pickup, with respect to the balance information; and a control section which controls the drive section. At the time of the predetermined operation of the optical pickup, the control section controls the drive section using the generated balance information, the obtained TE signal, and the previously stored relation information, thereby to adjust the focus of the objective lens.

Accordingly, the drive device of the present invention can adjust the focus of the objective lens, using relation information which represents the relation of the signal difference between the FE signal (focus error signal) and the TE signal (tracking error signal), at the time of a predetermined operation of the optical pickup (e.g., crossing tracks on an optical disc), with respect to the balance between the signals, and thus can realize a stable focus control at the time of the predetermined operation.

These and other objects, features, aspects and advantages of the present invention will become more apparent from the following detailed description of the present invention when taken in conjunction with the accompanying drawings.

DESCRIPTION OF THE PREFERRED EMBODIMENTS

With reference to the drawings, an embodiment of the present invention will be described hereinafter in detail. It is noted that an optical pickup to be explained hereinafter employs a phase difference method for tracking control and also employs an astigmatism method for focus control.

1. CONFIGURATION OF THIS EMBODIMENT

Figure 1:
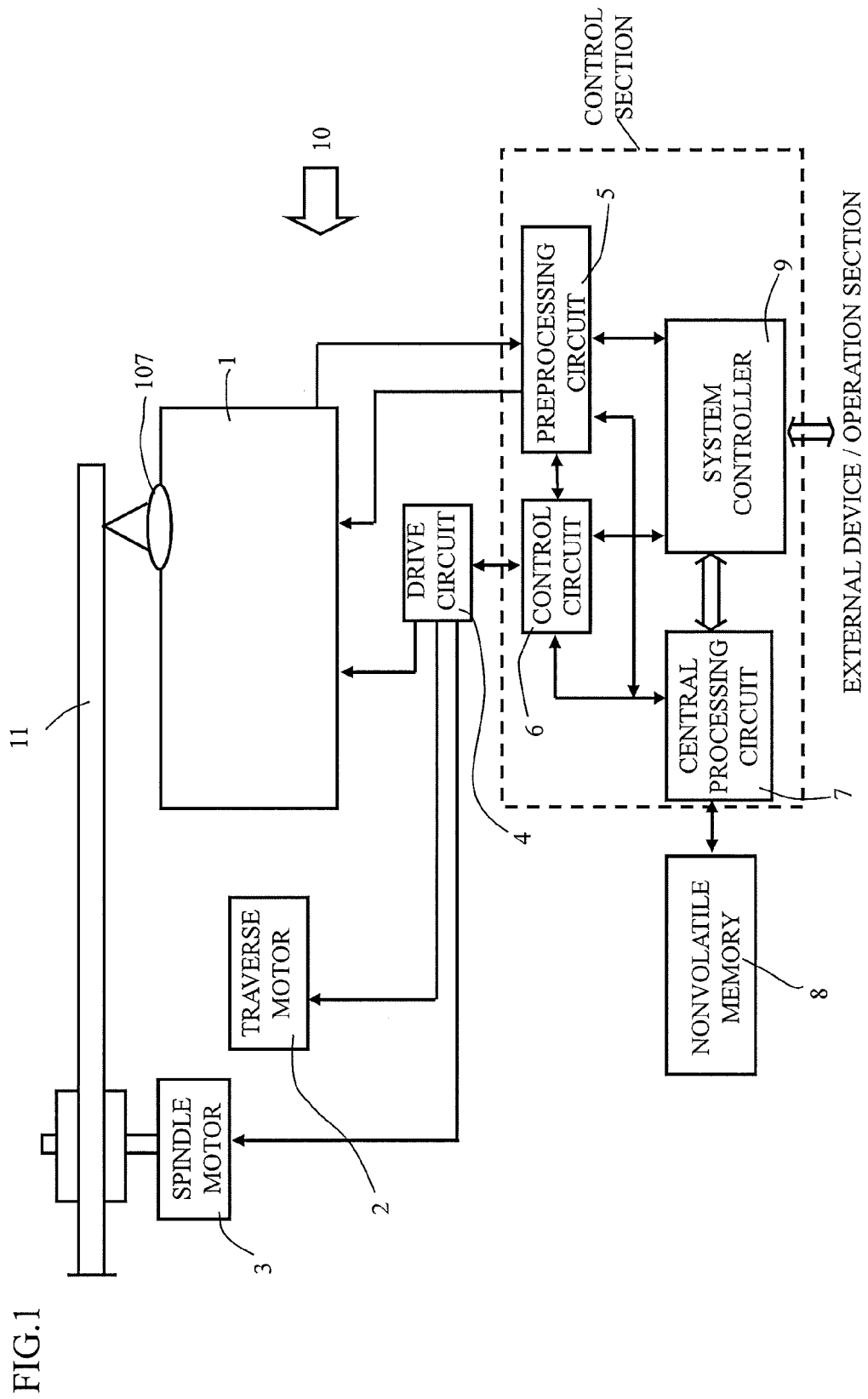
FIG. 1 is a diagram illustrating an example of a configuration of an optical drive according to an embodiment of the present invention.

1.1 Configuration of Optical Drive (FIG. 1)

With reference to FIG. 1, a configuration of an optical drive 10 will be described. The optical drive 10 can be used for a personal computer, an optical disc player, an optical disc recorder, and the like.

FIG. 1 is a configuration diagram of the optical drive 10. The optical drive 10 includes an optical pickup 1, a spindle motor 3 for rotating an optical disc 11, a traverse motor 2 for moving the optical pickup 1, and a control section for controlling these operations. The optical pickup 1 is electrically connected to a preprocessing circuit 5 which is a signal processing section, and to a drive circuit 4 which controls operations of an objective lens 107 and a light source (not illustrated in FIG. 1). The optical pickup 1 receives electrical signals from the drive circuit 4 and the preprocessing circuit 5 and transmits electrical signals to the preprocessing circuit 5.

Light reflected from the optical disc 11 is converted by a photodetector 111 (FIG. 2) of the optical pickup 1 into an electrical signal. The electrical signal is inputted to the preprocessing circuit 5 after traveling through a signal connection section which is not illustrated. Based on the electrical signal obtained from the optical pickup 1, the preprocessing circuit 5 performs processing such as generation of a servo signal including a focus error signal (hereinafter referred to as an FE signal) and a tracking error signal (hereinafter referred to as a TE signal), equalization of a waveform of a reproduced signal, binary slicing, and processing of an analog signal, i.e., the reproduced signal.

The servo signal generated by the preprocessing circuit 5 is inputted to a control circuit 6. The control circuit 6 causes an optical spot from the optical pickup 1 to trace the optical disc 11 by means of the drive circuit 4. The drive circuit 4 is connected to the optical pickup 1, the traverse motor 2, and the spindle motor 3. The drive circuit 4 realizes, by means of a digital circuit, a series of controls such as focus control of an objective lens 107, tracking control, traverse control of the optical pickup 1, and rotation control of the spindle motor 3. The drive circuit 4 controls driving of an actuator (coils 108 and magnets 109) for actuating the objective lens 107. In addition, the drive circuit 4 controls driving (traverse control) of the traverse motor 2 which moves the optical pickup 1 between the inner circumference and the outer circumference of the optical disc 11. Still further, the drive circuit 4 controls driving (rotation control) of the spindle motor 3 which rotates the optical disc 11.

The reproduced signal generated by the preprocessing circuit 5 is processed into a digital signal by a system controller 9. The reproduced signal having been processed into a digital signal is transferred to an external device via an interface circuit which is not illustrated. The preprocessing circuit 5, the control circuit 6, and the system controller 9 are connected to a central processing circuit 7, and they operate based on instructions given by the central processing circuit 7. A program controlling a series of operations described below is stored in advance as firmware in a semi-conductor device such as a nonvolatile memory 8. The series of operations include an operation of rotating the optical disc 11, an operation of moving the optical pickup 1 to a target position, an operation of forming an optical spot at a target track on the optical disc 11, an operation of causing the optical spot to trace a track, and the like. The firmware is read from the nonvolatile memory 8 in accordance with the operation of the optical drive 10. The read firmware is then executed by the central processing circuit 7.

It is noted that, in this embodiment, the preprocessing circuit 5, the control circuit 6, the central processing circuit 7, and the system controller 9 will be collectively referred to as a "control section". Further, the preprocessing circuit 5, the control circuit 6, the central processing circuit 7, the nonvolatile memory 8, and the system controller 9 can be realized in a semiconductor chip (IC chip). Still further, the drive circuit 4 can be realized by a driver IC. The operation of the control section (controller) will be described later.

It is noted that the nonvolatile memory 8 stores therein relation information. The relation information represents the relation of balance information, which represents deviation in a photodetector pattern on a photodetector of the optical pickup 1, with respect to a signal difference between the TE signal and the FE signal at the time of moving the optical pickup 1. The relation information will be described later.

Figure 2:
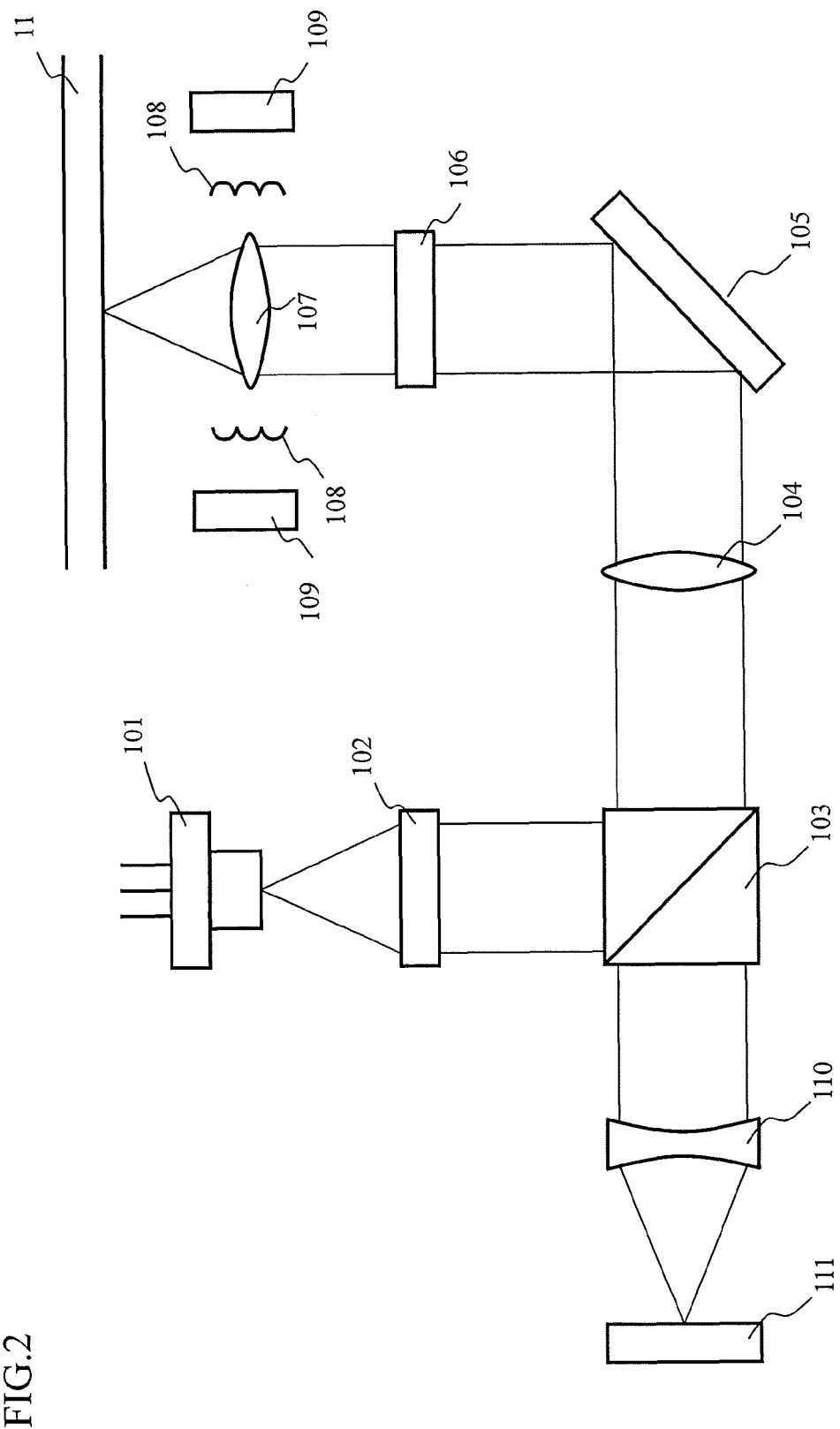
FIG. 2 is a diagram illustrating an example of a configuration of an optical pickup according to an embodiment of the present invention.

1.2 Configuration of Optical Pickup (FIG. 2)

With reference to FIG. 2, a configuration of the optical pickup 1 will now be described. FIG. 2 is a configuration diagram of the optical pickup 1. The optical pickup 1 includes a light source 101, a diffraction element 102, a prism 103, a collimating lens 104, a mirror 105, a wave plate 106, an objective lens 107, and coils 108 and magnets 109 which constitute a magnetic circuit for actuating the objective lens 107, a detection lens 110, and a photodetector 111.

As the light source 101, a semiconductor laser is used. The semiconductor laser adopts a blue-violet color (center wavelength 405 nm), a red color (center wavelength 650 nm), and an infrared color (center wavelength 780 nm). The diffraction element 102 diffracts a laser beam from the light source 101, and thereby the laser beam is converted into three beams. The prism 103 reflects the laser beam outputted from the light source 101, and allows light reflected (detected) from an optical disc 11 to pass therethrough. The laser beam from the light source 101 is diverging light, and thus the collimating lens 104 converts the laser beam into substantially parallel light. The mirror 105 changes the direction of the laser beam. The wave plate 106 polarizes the laser beam. The objective lens 107 converges the laser beam onto the face of the optical disc 11. To read signals recorded on the optical disc 11, the objective lens 107 is actuated by the coils 108 and the magnets 109 thereby to trace the optical disc 11. The light reflected (detected) from the optical disc 11 passes through the objective lens 107, wave plate 106, the mirror 105, the collimating lens 104, the prism 103, and the detection lens 110, and then reaches the photodetector 111. In this manner, the light reflected (detected) from the optical disc 11 is converged and irradiates the photodetector pattern 111a (FIG. 7(B)) of the photodetector 111. A signal outputted from the photodetector 111 is inputted to the preprocessing circuit 5 (a part of the control section).

Here, an object of this embodiment will be described briefly. In the optical drive 10, when the optical pickup 1 is being moved, a light spot from the optical pickup 1 crosses tracks on the optical disc 11, and thus the value of the FE signal increases or decreases. Under such a condition, if the optical drive 10 performs focus control based on the obtained FE signal, the focus control will become unstable. This is because the objective lens 107 is adjusted to focus on each track of the optical disc 11. Accordingly, the optical drive 10 is required to perform stable focus control when the optical pickup 1 is being moved. That is, the optical device 10 of this embodiment is designed to perform stable focus control when the optical pickup 1 is being moved to traverse the optical disc 11.

It is noted that, generally, the optical pickup is adjusted and fixed to a position so that outputs from the photodetector 111 will be optimal. Here, "optimal" means to set a signal balance to zero (the mathematical expression will be described later). However, generally, the signal balance may vary due to variation in the fixing position of the optical pickup 1 after its being adjusted, change in temperature characteristics, and the like. Thus, the signal balance will not necessarily be zero. Such variation in the signal balance also occurs due to deterioration with age. The variation in the signal balance is the matter to be taken into consideration herein.

2. DESCRIPTION OF CONTROL SECTION

The control section performs tracking control and focus control for the objective lens 107, based on the information inputted from the photodetector 111. Processing of the tracking control and the focus control will be described later in detail in the description on the operations.

The preprocessing circuit 5 of the control section is designed to generate a signal based on signals inputted from the photodetector 111. The signal will be described hereinafter specifically.

The preprocessing circuit 5 obtains an FE signal, a TE signal, and a signal balance in the tangential direction (hereinafter referred to as PDX), based on the signals inputted from the photodetector 111 (photodetector pattern 111a). It is noted that the TE signal is the signal balance in the radial direction of the optical disc 11.

Figure 7B:
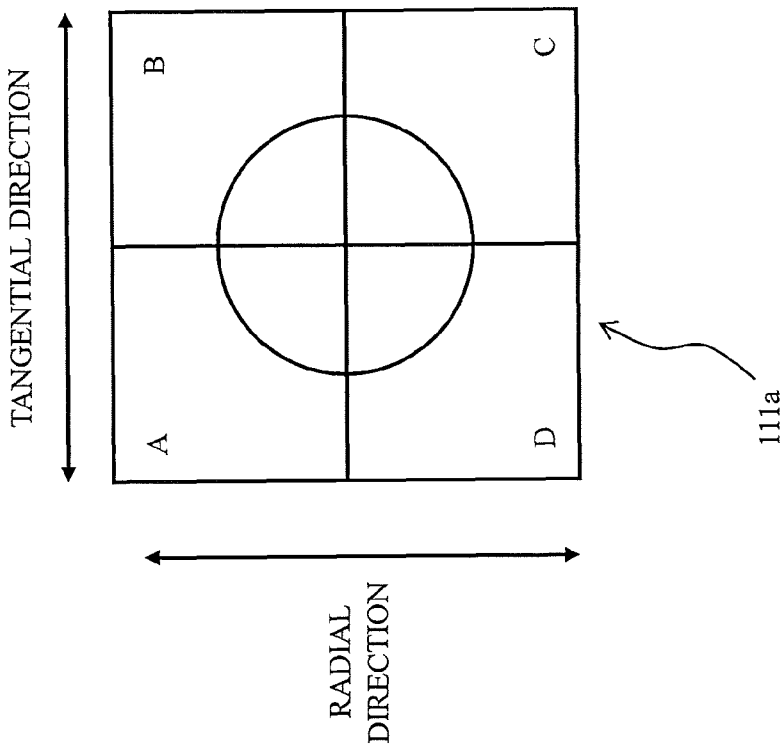
FIGS. 7A and 7B is a diagram for explaining balance information according to an embodiment of the present invention.
Figure 7A:
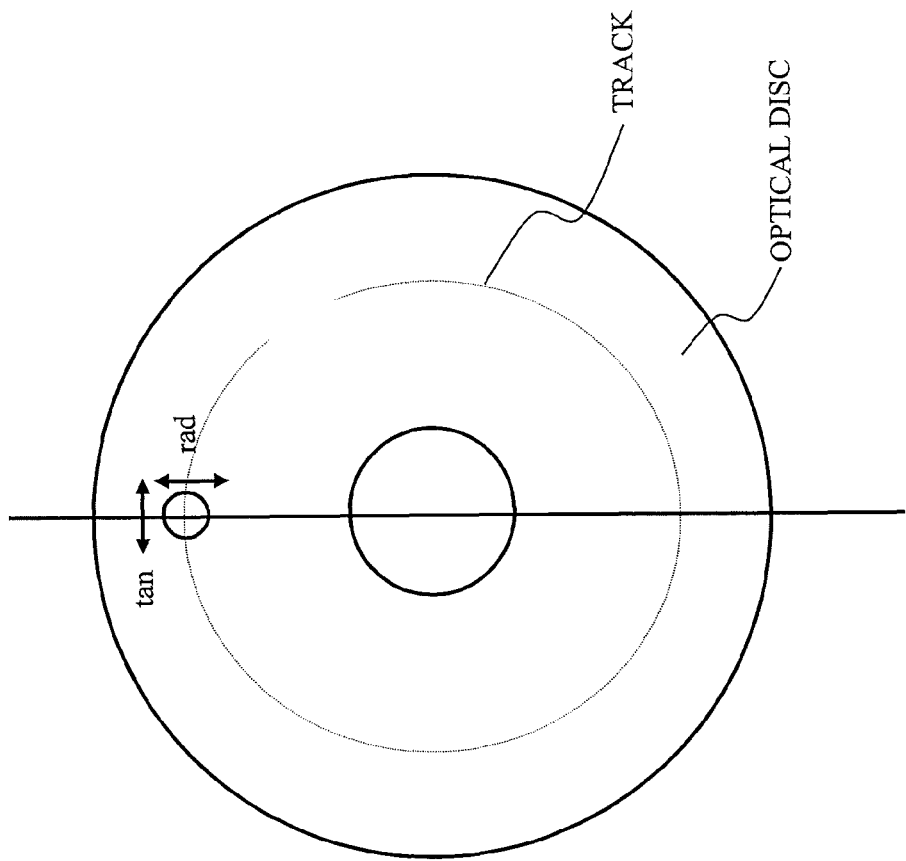

FIG. 7(A) is a diagram for explaining the tangential direction of the optical disc 11. In the diagram, the direction tangential to the optical disc 11 is the tangential direction (tan), and the direction normal to the optical disc 11 is the radial direction (rad). In addition, FIG. 7(B) is a diagram illustrating the photodetector pattern 111a provided on the photodetector 111. In FIG. 7(B), the vertical direction of the photodetector pattern 111a corresponds to the radial direction, and the horizontal direction corresponds to the tangential direction.

Under such a condition, the PDX can be obtained from Expression 1 below. Here, the PDX is an example of the balance information.

$$PDX=[(A+B)-(C+D)]/(A+B+C+D)\times 100\% \quad (1)$$

In addition, the TE signal, that is, the signal balance (PDY) in the radial direction can be obtained from Expression 2 below.

$$PDY=[(A+D)-(B+C)]/(A+B+C+D)\times 100\% \quad (2)$$

In addition, the FE signal (PDZ) can be obtained from Expression 3 below.

$$PDZ=(B+D)-(A+C) \quad (3)$$

In this embodiment, the preprocessing circuit 5 obtains the PDX when the optical disc 11 is started. The start of the optical disc 11 means the timing at which reproduction of information from the disc, or recording of information onto the disc, is started. That is, upon reception of a reproduction instruction or recording instruction from the outside (external device or control section operated by a user), the optical drive 10 causes the spindle motor 3 to rotate the optical disc 11, irradiates the optical disc 11 with a laser beam, and obtains the PDX with respect to the optical disc 11. In this embodiment, the start of the optical disc 11 is controlled by an external device (not illustrated).

The signals obtained by the preprocessing circuit 5 are inputted to the central processing circuit 7. Processing in the central processing circuit 7 will be described later in the description of the operations.

3. RELATION INFORMATION (FIG. 3, FIG. 4)

Next, the relation information stored in the nonvolatile memory 8 will be described. The relation information represents the relation of the signal balance with respect to the signal difference between the TE signal and the FE signal at the time of moving the optical pickup 1. The time of moving the optical pickup 1 means the time when the traverse motor 2 is moving the optical pickup 1. The time of moving may also be referred to as the time of seek operation.

The applicant has found through experiments that the relation of the signal balance with respect to the signal difference between the FE signal and the TE signal at the time of moving the optical pickup 1 presents a certain tendency. That is, it has been found that the signal difference between the FE signal and the TE signal at the time of moving the optical pickup 1 can be calculated from the PDX.

The applicant considered that instability of the focus control, which is caused by crossing tracks on the optical disc 11, can be solved by using the relation information, and thus has employed the following configuration.

That is, in this embodiment, at the time of moving the optical pickup 1, a corrected FE signal (correction information: AMI) is created by using the balance information, relation information, and the TE signal. In other words, the correction information AMI is different information from the FE signal (PDZ). In this embodiment, the focus control is then performed by using the corrected FE signal. Accordingly, in this embodiment, stable focus control can be realized at the time of moving the optical pickup 1.

Hereinafter, with reference to FIG. 3 and FIG. 4, the relation information will be described in detail.

Figure 8:
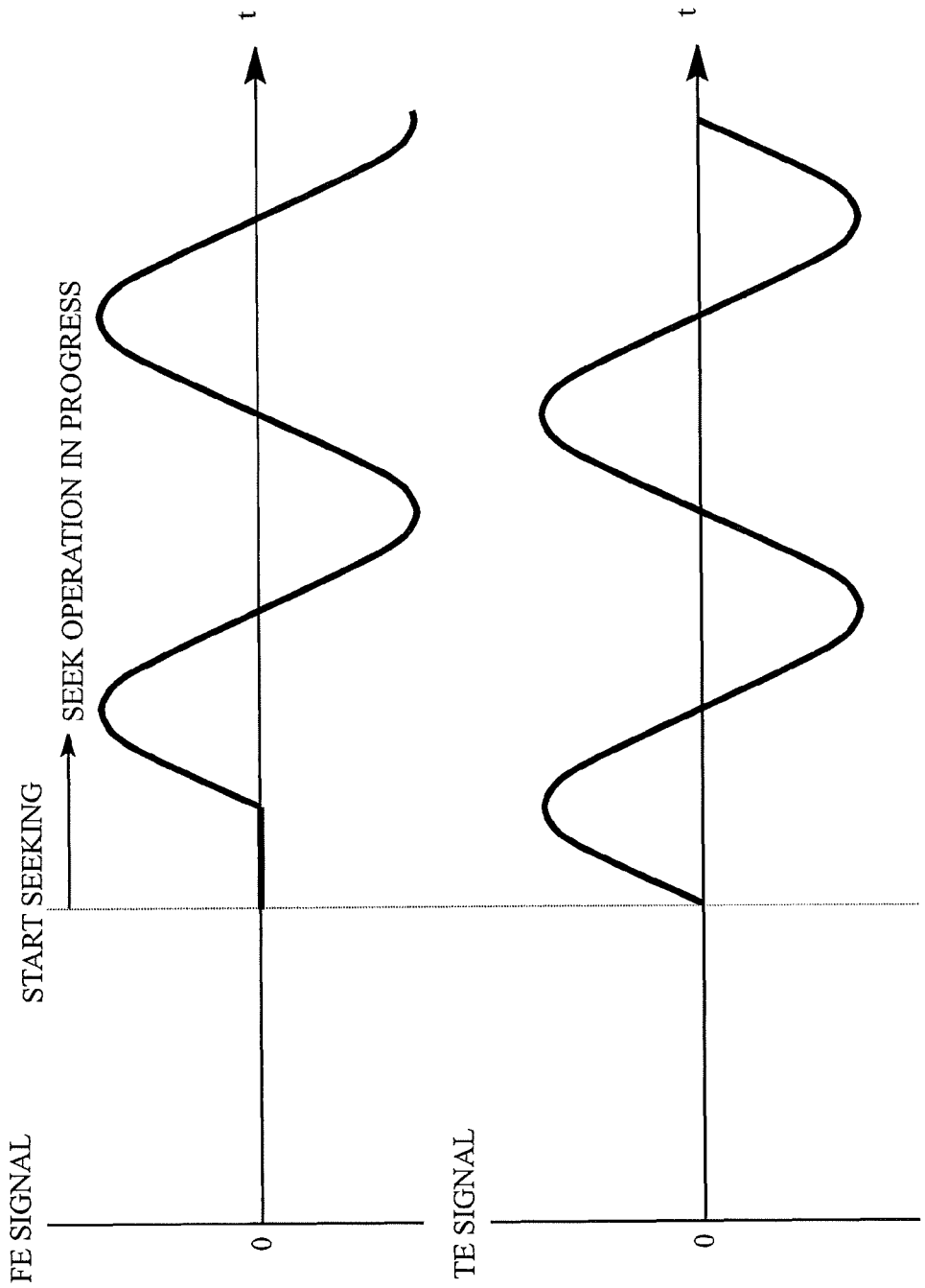
FIG. 8 is a diagram for explaining relation information between the FE signal and the TE signal according to an embodiment of the present invention.

The FE signal and the TE signal obtained by the preprocessing circuit 5 have waveforms, as shown in FIG. 8, at the time of moving the optical pickup 1. This is because, at the time of moving the optical pickup 1, the light having irradiated the optical disc 11 crosses the tracks on the optical disc 11.

FIG. 8 is a diagram illustrating the FE signal and the TE signal which are generated by the preprocessing circuit 5 in the case where information is read by moving the optical pickup 1 under a virtual condition where the PDX is 0%. In this manner, the FE signal and the TE signal can be represented by waveform signals (e.g., sine wave signals), and the relation between the FE signal and the TE signal can be represented by phase difference and amplitude difference. That is, if the PDX is 0%, the phase difference is 90 degrees, and the amplitude difference is 0.45 µm in the case of a DVD-RAM, and 0.2 µm in the case of a DVD-R/CD (FIG. 3 and FIG. 4).

In other words, the relation information can be represented with two pieces of information. That is, one is first relation information representing the relation of the signal balance (PDX) with respect to the phase difference between the FE signal and the TE signal, the phase difference occurring at the time of moving the optical pickup 1. The other is second relation information representing the relation of the signal balance (PDX) with respect to the amplitude difference between the FE signal and the TE signal, the amplitude difference occurring at the time of moving the optical pickup 1. The respective pieces of relation information will be described below.

Figure 3:
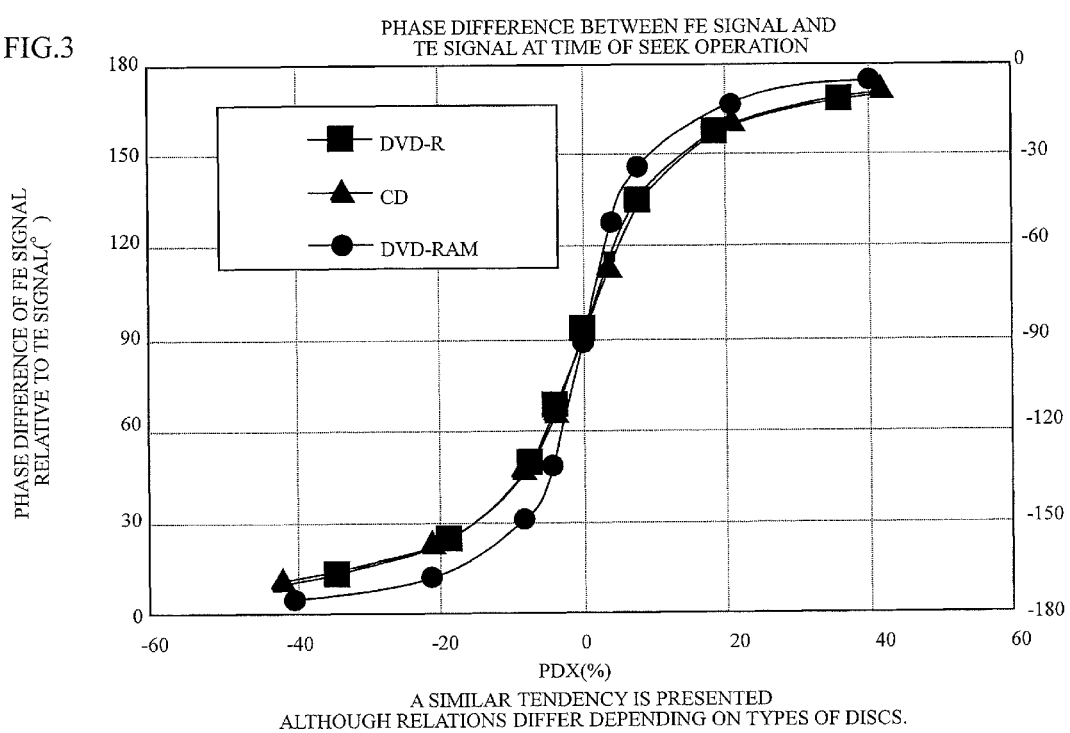
FIG. 3 is a diagram showing the relation of the phase difference (an example of first relation information) between an FE signal and a TE signal at the time of crossing tracks with respect to the signal balance in a tangential direction according to an embodiment of the present invention.

With reference to FIG. 3, the first relation information (relation information representing the relation of the signal balance (PDX) with respect to the phase difference between the TE signal and the FE signal) will be described. The relation was found by the applicant through experiments. Depending on the types of discs, the drawn curves differ slightly from one another. However, the curves present a similar tendency.

As shown in FIG. 3, it has been found, as to the relation between the PDX and the phase difference, that as the PDX increases from 0%, the phase difference becomes large, whereas as the PDX decreases from 0%, the phase difference becomes small. Specifically, as shown in FIG. 3, when the PDX is 0%, the phase difference is 90 degrees. When the PDX is 40%, the phase difference is about 180 degrees. When the PDX is −40%, the phase difference is about 0 degrees.

Therefore, by using the first relation information, the phase difference of the FE signal relative to the TE signal can be calculated from the value of the PDX, with respect to each optical drive 10.

Next, with reference to FIG. 4, the second relation information (relation information representing the relation of the signal balance (PDX) with respect to the amplitude difference between the TE signal and the FE signal) will be described. The relation was found by the applicant through experiments. Depending on the types of discs, the drawn curves differ slightly from one another. However, the curves present a similar tendency. As shown in FIG. 4, it has been found, as to the relation between the PDX and the amplitude difference, that as the PDX increases from 0%, the amplitude difference becomes large, and as the PDX decreases from 0%, the amplitude difference becomes large. Specifically, as shown in FIG. 4 (an example of DVD-R), when the PDX is 0%, the amplitude difference is substantially 0 μm. When the PDX is 40%, the amplitude difference is about 1 μm. When the PDX is −40%, the amplitude difference is about 1 μm.

Therefore, by using the second relation information, the amplitude difference of the FE signal relative to the TE signal can be calculated from the value of the PDX, with respect to each optical drive 10.

Figure 4:
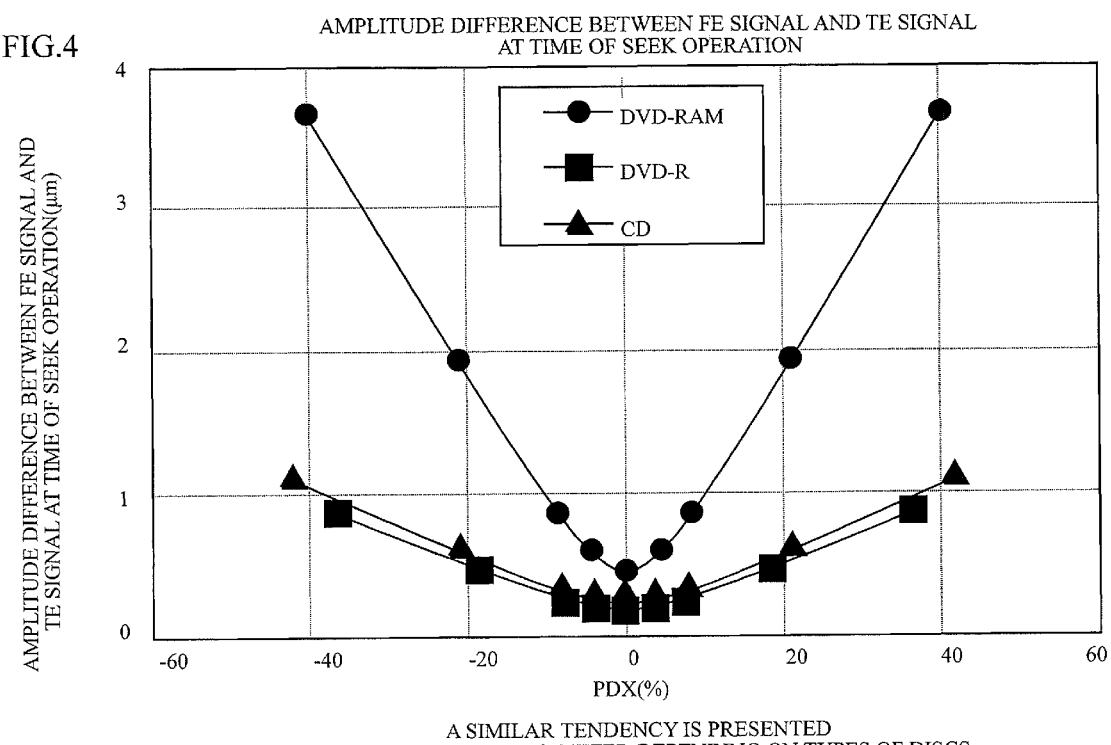
FIG. 4 is a diagram showing the amplitude difference (an example of second relation information) between the FE signal and the TE signal at the time of crossing tracks with respect to the signal balance in the tangential direction according to an embodiment of the present invention.

The relations shown in FIG. 3 and FIG. 4 are stored in advance as data tables in the nonvolatile memory 8. In this embodiment, the relation information representing the relations which differ depending on the types of discs is stored in the nonvolatile memory 8. That is, the nonvolatile memory 8 stores therein the first relation information for DVD-RAM, the second relation information for DVD-RAM, the first relation information for DVD-R, the second relation information for DVD-R, the first relation information for CD, the second relation information for CD, and the like. It is noted that, although not illustrated, the relation information for BD is also stored in the nonvolatile memory 8.

Accordingly, in the optical drive 10, when the PDX is known, the phase deviation (phase difference) of the phase of the FE signal, which is caused by crossing tracks, relative to the phase of the TE signal can be calculated. In addition, in the optical drive 10, when the PDX is known, the amplitude deviation (amplitude difference) of the amplitude of the FE signal, which is caused by crossing tracks, relative to the amplitude of the TE signal can be calculated. The optical drive 10 incorporates the phase difference into the phase of the obtained TE signal and incorporates the amplitude difference into the amplitude of the obtained TE signal, thereby to calculate a corrected FE signal. Therefore, the optical drive 10 generates corrected information based on the relation information shown in FIG. 3 and FIG. 4, the PDX, and the TE signal. The optical drive 10 then performs focus control using the corrected information, thereby realizing stable focus control at the time of crossing tracks.

4. OPERATION OF OPTICAL DRIVE

Next, with reference to FIG. 5 and FIG. 6, an operation of the optical drive 10 will be described.

Figure 5:
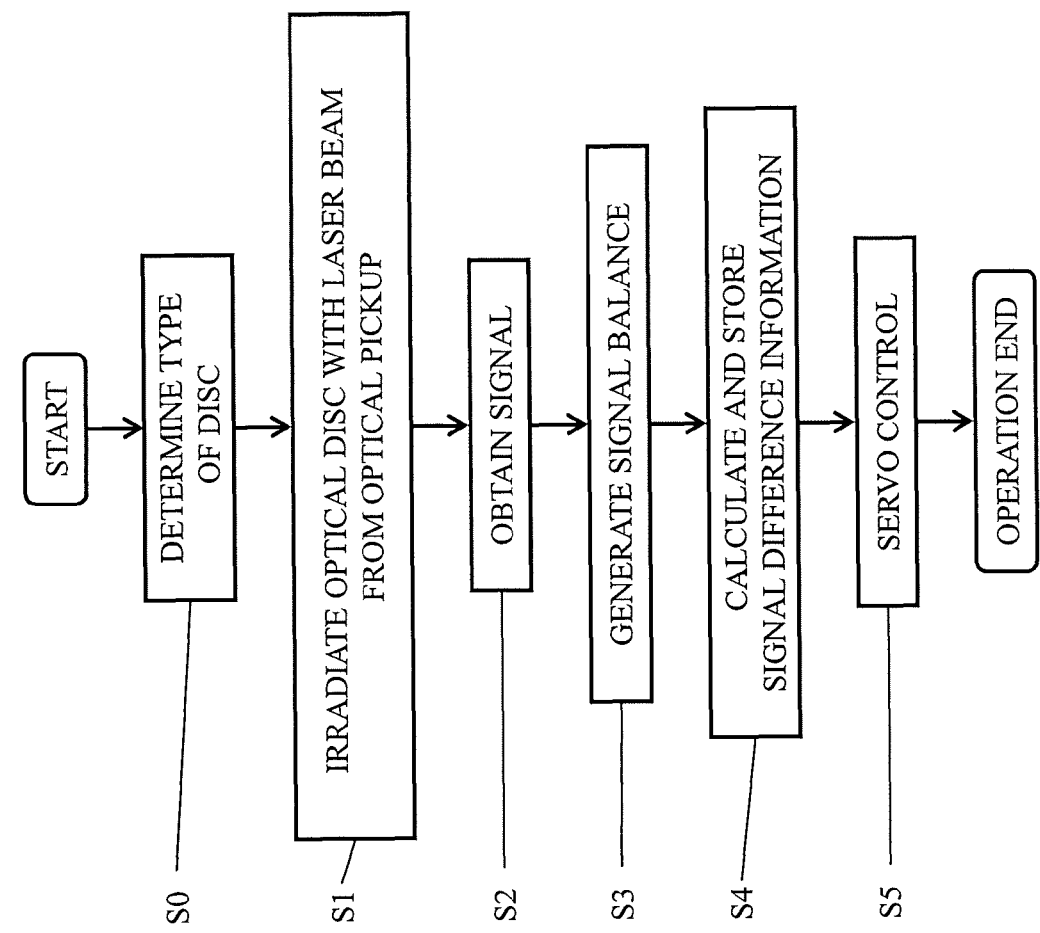
FIG. 5 is a flowchart showing an example of operations of the optical drive according to an embodiment of the present invention.

4.1 Operation at Start of Optical Disc (FIG. 5)

The operation at the start of the optical disc 11 will be now described (FIG. 5). FIG. 5 is a flowchart showing operations performed by the control section. The central processing circuit 7 executes a program stored in the nonvolatile memory 8, and operates as follows. It is noted that the start of the optical disc 11 means, as described above, the timing at which reproduction of information stored in an optical disc 11 from the disc, or recording of information onto the optical disc 11, is started. In this embodiment, the optical drive 10 is configured such that instructions for starting the optical disc 11 are to be received from an external device or the like via the system controller 9. In this operation example, a case of reproducing information from a DVD-RAM will be described.

First, after the optical drive 10 is powered on and started, upon reception of control of reading of the optical disc 11 or control of writing to the optical disc 11, the optical drive 10 executes the following operations.

The central processing circuit 7 determines the type of the optical disc 11 (S0). The light reflection factor of the optical disc 11 varies depending on the type of the optical disc. Thus, the type of the optical disc 11 is determined by using the relation between the type of the optical disc 11 and the reflection factor. Specifically, the determination is made as follows. The central processing circuit 7 controls the optical pickup 1 so as to radiate a red light from the light source 101. The red light irradiates the optical disc 11, and the light reflected therefrom is detected by the photodetector 111. A signal relating to the light detected by the photodetector 111 is inputted to the central processing circuit 7. Based on the obtained signal (reflection factor), the central processing circuit 7 determines whether the optical disc 11 is a CD. When the central processing circuit 7 has determined that the optical disc 11 is not a CD, it controls the optical pickup 1 so as to radiate an infrared light from the light source 101. The infrared light irradiates the optical disc 11, and the light reflected therefrom is detected by the photodetector 111. The signal relating to the light detected by the photodetector 111 is inputted to the central processing circuit 7. Based on the obtained signal (reflection factor), the central processing circuit 7 determines whether the optical disc 11 is a DVD-RAM, a DVD-R, or a DVD. In this manner, the central processing circuit 7 determines the type of the optical disc 11. The central processing circuit 7 retains information representing the type of the optical disc 11 in a buffer memory which is not illustrated in the drawings. In this operation, the central processing circuit 7 determines, for example, that the optical disc 11 is a DVD-RAM.

In order to irradiate the optical disc 11 with the laser beam, the central processing circuit 7 controls the optical pickup 1 by means of the control circuit 6 and the drive circuit 4 (S1). The light reflected from the optical disc 11 is detected by the optical pickup 1. The optical pickup 1 outputs the detected signal to the preprocessing circuit 5.

The preprocessing circuit 5 obtains the signal outputted from the optical pickup 1 (S2). Based on the obtained signal, the preprocessing circuit 5 generates servo signals (TE signal (Expression 2) and FE signal (Expression 3)) and also generates a PDX (S3).

The preprocessing circuit 5 transmits the generated servo signals (TE signal and FE signal) and the PDX to the central processing circuit 7.

With the PDX and the relation information, the central processing circuit 7 calculates the phase difference of the FE signal relative to the TE signal, and the amplitude difference of the FE signal relative to the TE signal (S4). Here, since the optical disc 11 is a DVD-RAM, the central processing circuit 7 reads from the nonvolatile memory 8 the first relation information for DVD-RAM (relation between the PDX and the phase difference), and the second relation information for DVD-RAM (relation between the PDX and the amplitude difference). By using the read relation information, the central processing circuit 7 generates signal difference information from the obtained PDX. The signal difference information is such information, for example, that represents phase difference=X degrees, and amplitude difference=Yμm. The central processing circuit 7 stores the generated signal difference information into the nonvolatile memory 8 (S4).

In addition, based on the servo signal (FE signal and TE signal) outputted from the preprocessing circuit 5, the central processing circuit 7 performs servo control (tracking control and focus control) with respect to the optical disc (S5). The focus control by the central processing circuit 7 is as per the description in 4.2 below. Based on signals inputted from the optical pickup 1, the preprocessing circuit 5 sequentially generates servo signals, and sequentially outputs the servo signals to the central processing circuit 7.

Figure 6:
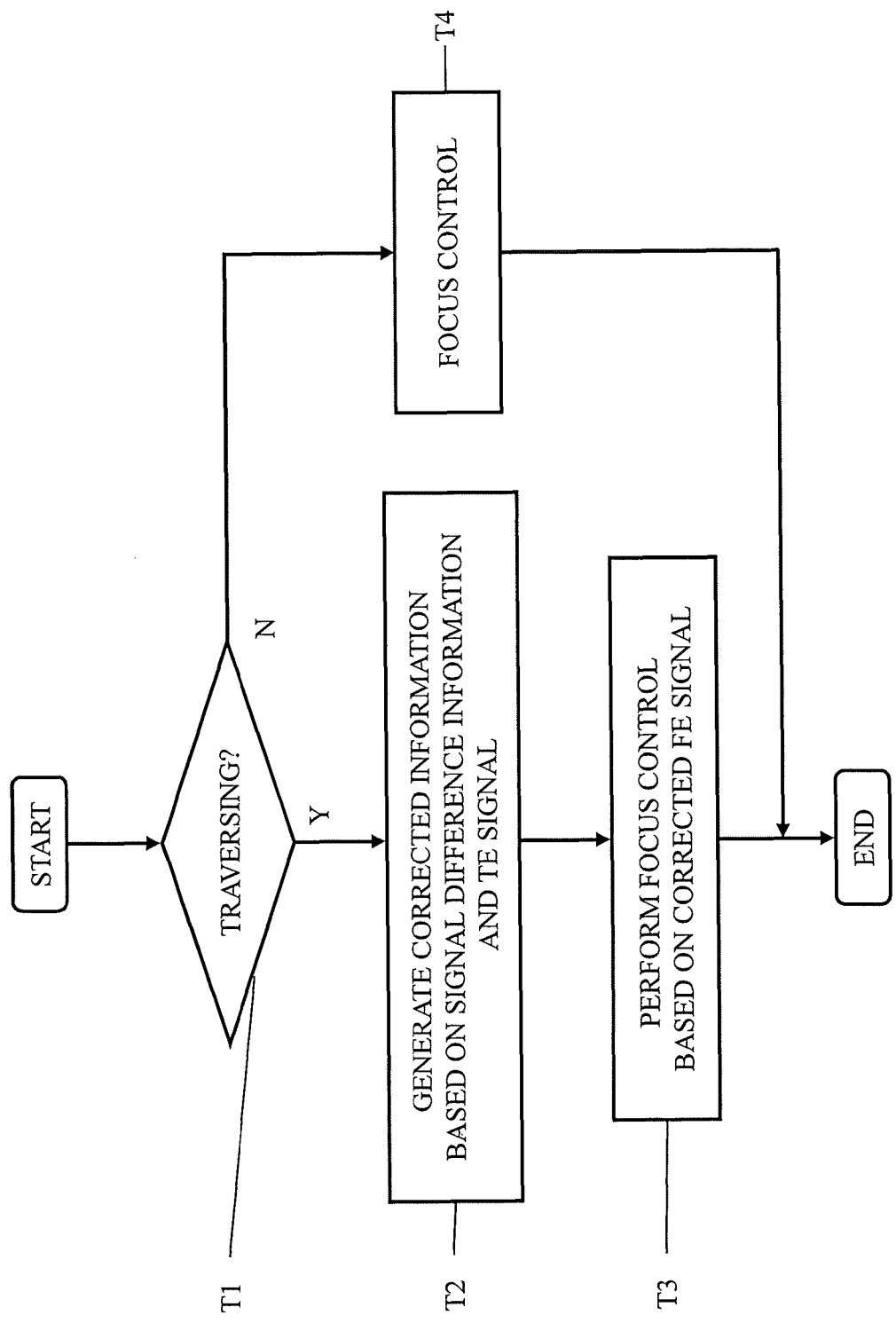
FIG. 6 is a flowchart showing an example of operations of the optical drive according to an embodiment of the present invention.

4.2 Operation of Focus Control (FIG. 6)

Hereinafter, with reference to FIG. 6, an operation of the focus control by the central processing circuit 7 will be described. Based on the obtained FE signal, the central processing circuit 7 performs the following processing for focus control.

First, the central processing circuit 7 determines whether the optical pickup 1 is being moved by the traverse motor 2 (T1). The central processing circuit 7 is configured such that upon reception of a control signal corresponding to instructions for moving the optical pickup 1 from an external device via the system controller 9, the central processing circuit 7 transmits a traverse instruction signal corresponding to the control signal to the traverse motor 2 via the drive circuit 4. Accordingly, the central processing circuit 7 can determine whether the optical pickup 1 is currently being moved.

When the central processing circuit 7 has determined that the traverse motor 2 is not moving the optical pickup 1, the central processing circuit 7 controls the optical pickup 1 by means of the drive circuit 4 and adjusts the focus of the objective lens 107 in the optical pickup 1, such that the FE signal obtained in S3 will be 0 (T4).

On the other hand, when the central processing circuit 7 has determined that the traverse motor 2 is moving the optical pickup 1, the central processing circuit 7 reads the signal difference information stored in the nonvolatile memory 8, and generates corrected information (AMI) by using the read signal difference information and the TE signal having been obtained (T2).

Specifically, the central processing circuit 7 generates corrected information (AMI) from Expression 5 below. Prior to the explanation of Expression 5, the precondition of Expression 5 will be described. First, the TE signal shown in FIG. 8 can be represented by TEI in Expression 4 also described below. That is, A is a maximum amplitude value of the TE signal, and θ is the phase of the TE signal.

Based on such a precondition, the corrected information (AMI) can be represented by Expression 5 below by using the TE signal (TEI) and the signal difference information (phase difference: X, amplitude difference: Y).

$$TEI = A \times \sin\theta \quad (4)$$

$$AMI = |A+Y| \times \sin(\theta+X) \quad (5)$$

In this manner, the central processing circuit 7 generates the corrected information (AMI). Accordingly, the central processing circuit 7 can use the generated corrected information (AMI) as a corrected FE signal. The corrected FE signal is an FE signal suitable for focus control at the time of seek operation.

The central processing circuit 7 performs the focus control based on the corrected FE signal (T3). That is, the central processing circuit 7 controls the optical pickup 1 by means of the drive circuit 4 and adjusts the focus of the objective lens 107 in the optical pickup 1, such that the correct FE signal will be θ.

5. CONCLUSION

The optical drive 10 of this embodiment includes the optical pickup 1, the preprocessing circuit 5 which processes an optical signal detected by the optical pickup 1, the nonvolatile memory 8 which stores therein relation information (phase difference and amplitude difference) shown in FIG. 3 and FIG. 4, and the central processing circuit 7 which performs the focus control of the optical pickup 1. The preprocessing circuit 5 obtains the signal balance (PDX) of the optical pickup 1. The preprocessing circuit 5 also obtains the FE signal and the TE signal with respect to the optical disc 11. The central processing circuit 7 derives the phase difference and the amplitude difference from the signal balance and the relation information, and calculates, based on these differences and the TE signal, a FE signal suitable for the case where the optical pickup 1 is being moved.

In addition, the optical drive 10 further includes the traverse motor 2 which moves the optical pickup 1. When the optical pickup 1 is being moved, the central processing circuit 7 calculates an FE signal suitable for the case where the optical pickup 1 is being moved, from the generated signal balance (PDX), the relation information stored in the nonvolatile memory 8, and the TE signal having been obtained.

Accordingly, the corrected FE signal can be calculated based on the relation information stored in advance in the nonvolatile memory 8, and thus even in the case where the optical pickup 1 is being moved and the signal balance of the optical pickup 1 varies, it is possible to perform a stable servo control.

Other Embodiments

As an example of embodiments of the present invention, the above embodiment has been described. However, the present invention is not limited to the above embodiment, but can be realized in other embodiments. Thus, other embodiments of the present invention will be described below collectively.

In the above embodiment, the relation information shown in FIG. 3 and FIG. 4 are stored as data tables in the nonvolatile memory 8. However, the relation information may be stored in the form of mathematical expressions.

Further, the predetermined operation of the optical pickup 1 is not limited to the moving of the optical pickup 1. Other than this, the present invention may be applied to a case where the optical pickup 1 operates under a state where the TE signal does not include a noise and the FE signal includes a noise, and even in such a case a stable focus control can be realized.

While one embodiment of the present invention has been described in detail, the foregoing description is in all aspects illustrative and not restrictive. It will be understood that numerous other modifications and variations can be devised without departing from the scope of the invention.

What is claimed is:

1. A drive device, comprising:
   an optical pickup, including:
      a light source;
      an objective lens which converges light from the light source onto an optical disc;
      a drive section which drives the objective lens so as to control focus onto the optical disc; and
      a photodetector section which detects light reflected from the optical disc;
   a generation section which generates, based on an optical signal detected by the photodetector section, balance information which represents deviation in a photodetector pattern on the photodetector section in the tangential direction of the optical disc;
   an FE obtaining section which obtains, based on the optical signal detected by the photodetector section, an FE signal which represents an amount of focus deviation of the objective lens relative to the optical disc;
   a TE obtaining section which obtains, based on the optical signal detected by the photodetector section, a TE signal which represents an amount of tracking deviation of the objective lens relative to the optical disc;
   a storage section which previously stores therein relation information which represents relation of a signal difference between the FE signal and the TE signal, at the time of a predetermined operation of the optical pickup, with respect to the balance information; and
   a control section which controls the drive section, wherein at the time of the predetermined operation of the optical pickup, the control section controls the drive section using the generated balance information, the obtained TE signal, and the previously stored relation information, thereby to adjust the focus of the objective lens.

2. The drive device according to claim 1, further comprising
   a traverse section which moves the optical pickup in the radial direction of the optical disc, wherein
   the predetermined operation of the optical pickup is an operation of moving the optical pickup by the traverse section.

3. The drive device according to claim 1, wherein, at the time of the predetermined operation of the optical pickup, the control section controls the drive section using the generated balance information, the obtained TE signal, and the stored relation information without using the obtained FE signal thereby to adjust the focus of the objective lens.

4. The drive device according to claim 1, wherein
   the control section
      controls the drive section using the obtained FE signal, at the time of other operations of the optical pickup than the predetermined operation, thereby to adjust the focus of the objective lens, and
      controls the drive section using the generated balance information, the obtained TE signal, and the stored relation information without using the obtained FE signal, at the time of the predetermined operation of the optical pickup, thereby to adjust the focus of the objective lens.

5. The drive device according to claim 1, wherein:
   the relation information includes
      first relation information which represents the relation of a phase difference between the FE signal and the TE signal, at the time of the predetermined operation of the optical pickup, with respect to the balance information, and
      second relation information representing the relation of an amplitude difference between the FE signal and the TE signal, at the time of the predetermined operation of the optical pickup, with respect to the balance information; and
   the control section controls, at the time of the predetermined operation, the drive section using the phase difference between the FE signal and the TE signal, the phase difference being calculated from the balance information and the first relation information, the amplitude difference between the FE signal and the TE signal, the amplitude difference being calculated from the balance information and the second relation information, and the obtained TE signal, thereby to adjust the focus of the objective lens.

6. The drive device according to claim 1, wherein the generation section generates the balance information based on the optical signal detected by the photodetector section at the start of reading of the optical disc.

7. A method for controlling a drive device, the drive device including: an optical pickup which includes a light source, an objective lens which converges light from the light source onto an optical disc, a drive section which drives the objective lens so as to control focus onto the optical disc, and a photodetector section which detects light reflected from the optical disc; a control section which controls the drive section based on a signal detected by the photodetector section; and a storage section which previously stores therein relation information which represents relation of a signal difference between an FE signal and a TE signal, at the time of a predetermined operation of the optical pickup, with respect to balance information which represents deviation in a photodetector pattern on the photodetector section in the tangential direction of the optical disc, the method being executed by the control section and comprising the steps of:
   generating the balance information, based on an optical signal detected by the photodetector section;
   obtaining the FE signal and the TE signal, based on the optical signal detected by the photodetector section; and
   controlling the drive section using the generated balance information, the obtained TE signal, and the relation information previously stored in the storing section, thereby to adjust focus of the objective lens.

8. The method according to claim 7, wherein
   the drive device further includes a traverse section which moves the optical pickup in the radial direction of the optical disc, and
   the predetermined operation of the optical pickup is an operation of moving the optical pickup by the traverse section.

9. The method according to claim 7, wherein
   the controlling step executed by the control section controls, at the time of the predetermined operation of the optical pickup, the drive section using the generated balance information, the obtained TE signal, and the previously stored relation information, thereby to adjust the focus of the objective lens.

* * * * *